STEREOPHONIC DETECTING AND MATRIXING CIRCUIT
Filed Feb. 4, 1960
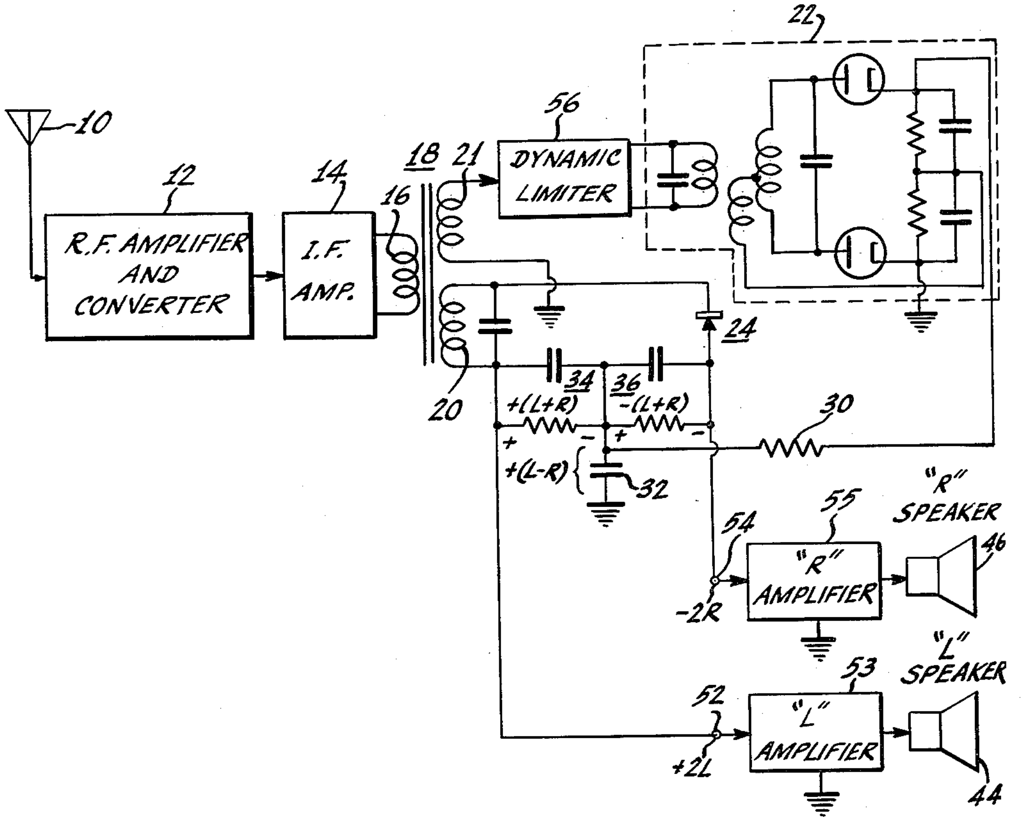
INVENTOR.
JOSEPH O. PREISIG
BY Eugene M. Whitacre
ATTORNEY

United States Patent Office 3,059,189
Patented Oct. 16, 1962

3,059,189
STEREOPHONIC DETECTING AND MATRIXING CIRCUIT

Joseph O. Preisig, Trenton, N.J., assignor to Radio Corporation of America, a corporation of Delaware Filed Feb. 4, 1960, Ser. No. 6,751
6 Claims. (Cl. 329—135)

This invention relates to radio receiver circuits for the reception of a wave modulated with stereophonic sound information, and more particularly to receiver circuits for the detection and separation of a pair of stereophonically related signals from a received wave modulated in amplitude and angle by a pair of stereophonically related signals.

Various methods have been proposed for transmitting stereophonic information within the standard broadcast band that are compatible with present AM monophonic transmission. One method of deriving signals which may be reproduced stereophonically is to pick up the same sound source from points displaced in space. The picked up signals, which may be called the left (L) and right (R) signals, are thus stereophonically related. Acceptable stereophonic reproduction may be obtained by using only two microphones to pick up the sound signals. The stereophonically related signals may be transmitted directly or recorded individually for future transmission. In either case, a degree of compatibility between AM monophonic systems and stereophonic systems is insured by transmitting the sum of a pair of stereophonically related signals as amplitude modulation of a broadcast carrier wave and the difference of the pair of stereophonic signals as angle modulation of the wave. Thus, the sum signal $(L+R)$ amplitude or envelope modulates the carrier wave and the difference signal $(L-R)$ angle modulates the carrier wave. A standard, monophonic broadcast receiver detects and reproduces only the sum $(L+R)$ of the signals carried as amplitude modulation of the carrier.

In a stereophonic receiver it is necessary not only to demodulate the amplitude modulation and angle modulation of the carrier, but also to add and subtract the detected $(L+R)$ and $(L-R)$ signals to recreate the individual L and R signals. It has been the practice heretofore to use resistive matrixing circuits to add and subtract the $(L-R)$ and $(L+R)$ signals to produce the individual L and R signals. Such resistive matrixing circuits, however, necessarily entail undesired signal attenuation, and may cause undesirable cross-talk between the detected amplitude and angle modulation signals.

There has been disclosed in a concurrently filed application for Roland N. Rhodes and Larry A. Freedman entitled "Stereophonic Sound Signalling System" Serial Number 6,654 a lossless matrixing circuit for detected stereophonically related signals that are detected from a wave, angle and amplitude modulated with the signals. This invention is an improvement on the circuit shown in the aforementioned Rhodes and Freedman application.

It is, therefore, an object of this invention to provide an improved detecting and matrixing circuit for a stereophonic signal receiver to derive stereophonic signals for reproduction from a pair of stereophonically related signals received as amplitude and angle modulation of a single carrier wave.

It is a further object of this invention to provide an improved matrixing circuit for deriving stereophonic signals for reproduction from a pair of stereophonically related signals received as amplitude and angle modulation of a single carrier wave in an essentially lossless circuit that is both economical and practical.

These and other objects of the invention are achieved briefly by providing a demodulator and matrix for a carrier wave which is amplitude modulated by the sum $(L+R)$ of a pair of stereophonically related signals (L and R) and angle modulated by the difference $(L-R)$ of the pair of signals, that includes an amplitude modulation detector utilizing a single rectifier element and a split detector load circuit for deriving across its load circuit two polarities of detected signal and an angle modulation detector that derives at its output circuit a single polarity of detected signal corresponding to the angle modulation of the wave. The output circuits of the two detectors are connected to a pair of utilization circuits such that the angle modulation signal is individually added to both polarities of the detected amplitude modulation signal to recreate the individual L and R signals.

The invention may be better understood, however, when the following description is read in connection with the accompanying drawing in which the sole FIGURE of the drawing is a schematic circuit diagram of a stereophonic signal receiver utilizing signal detectors and matrixing circuits in accordance with the present invention.

Referring now to the sole figure of the drawing, a stereophonic signal receiver comprises an antenna 10 for intercepting a transmitted radio frequency wave that is amplitude and angle modulated by a pair of stereophonically related signals. As previously mentioned, in one form of stereophonic broadcasting system a pair of stereophonically related signals (L and R) are added to produce a sum signal $(L+R)$ to amplitude modulate a radio frequency carrier wave, and are subtracted to produce a difference signal $(L-R)$ to angle modulate the wave. The intercepted radio frequency wave is amplified by a radio frequency (RF) amplifier and converter 12 of the receiver, which generates an intermediate frequency (IF) wave, which is in turn applied to an IF amplifier 14. The RF amplifier and converter 12 and the IF amplifier 14 may be of known design. The IF wave from the IF amplifier 14 is applied to the primary winding 16 of an IF transformer 18, and is thus developed across the secondary winding 20 and tertiary winding 21 of the transformer 18.

In accordance with the invention, the IF wave appearing across at the transformer is applied basically to two paths. The first path is from the tertiary winding 21 through a dynamic limiter 56 to an angle modulation detector 22, and the second path is from the secondary winding 20 to an amplitude modulation (i.e., envelope) detector which comprises an AM detector diode 24, together with its associated circuitry.

More specifically, the IF wave is applied from one terminal of the tertiary winding 21 through the dynamic limiter 56 to the angle modulation detector 22, with the other terminal of the tertiary winding 21 being returned to ground of the receiver. The dynamic limiter 56 may be of the type disclosed in an application filed for Jack Avins on November 13, 1959, Serial No. 852,719 and entitled "Stereophonic Sound Receiver System." The purpose of the dynamic limiter 56 is to strip the amplitude modulation from the wave while at the same time varying the peak-to-peak amplitude of the wave applied to the angle modulation detector 22 in accordance with the signal strength of the intermediate frequency wave. This is done to maintain a constant ratio between the amplitude of the detected amplitude modulation signal and the amplitude of the detected angle modulation signal, as the signal strength of the received wave varies. The angle modulation detector circuit 22 may be of any known design in which the output signal amplitude is the product of the angle modulation and amplitude of the wave applied to the circuit. The specific angle modulation detector shown is that disclosed in Patent 2,121,103 for S. W. Seeley, issued June 21, 1938.

The AM detector diode 24 is connected in series with a first load circuit 34 and a second load circuit 36 across the secondary winding 20. This connection provides a positively going detected signal across the first load circuit 34, with respect to the junction of the two detector load circuits 34 and 36, and a negatively going detected signal across the second load circuit 36. As will be apparent, opposite polarity detected AM output signals may thus be taken from across the two load circuits.

The output signal of the angle modulation detector, such as a frequency modulation detector, is generally applied through a de-emphasis network to a utilization circuit, since it is general practice to pre-emphasize the higher audio frequency signals that are being transmitted by an angle modulation transmitter. Such pre-emphasis circuits are described in connection with a broadcast band stereophonic system that utilizes amplitude and angle modulation of a carrier wave disclosed in copending application, Serial No. 799,680, filed March 16, 1959 for Avins and Holt and entitled "Multiplicative Stereophonic Sound Signalling System."

Accordingly, the detected output signal of the angle modulation detector 22 is applied through a de-emphasis network comprising resistor 30 and capacitor 32 to the junction of the first and second load circuits 34 and 36 of the diode 24. The capacitor 32 serves the dual purpose of providing a low impedance path to ground for IF currents, and in conjunction with resistor 30 serves to de-emphasize the output of the angle modulation detector 22. The audio signals detected by diodes 24 are of course not developed across the capacitor 32 because of opposite phase cancellation; these signals are reveloped across the load circuits 34 and 36, respectively, as previously described. Another way of considering the circuit connections is to regard the AM detectors as not themselves being grounded to an audio reference potential for the receiver, but as being floated for additive combination on the de-emphasis circuit of the angle modulation detector 22. The AM detectors are grounded to IF reference potential by capacitor 32.

There appears across the de-emphasis capacitor 32 the detected signal corresponding to the angle modulation component of the received wave, or, in the example described, the $(L-R)$ signal. The $(L-R)$ signal is applied to the junction of the first and second AM detector load circuits 34 and 36. A first output terminal 52 is connected to both the first detector load circuit 34 and an "L" amplifier 53 and a second output terminal 54 is connected both to the second detector load circuit 36 and an "R" amplifier 55. Thus, the signal applied to the "L" amplifier is the sum of $+(L+R)$ signal, which appears across the first detector load circuit 34, and the $+(L-R)$ signal, which appears across the de-emphasis capacitor 32. The resultant signal applied to the "L" amplifier 53 is equal to the sum of these two signals, or +2L. The $+(L-R)$ signal across the de-emphasis capacitor 32 is also applied to the "R" amplifier 55 through the second detector load circuit 36, across which appears a $-(L+R)$ signal. By addition, the input signal to the R amplifier 55 is equal to −2R. The "L" and "R" signals are properly phased in the "L" and "R" circuits or the loudspeakers so that correct stereophonic sound is available from the "L" and "R" loudspeakers 44 and 46.

Utilization of the amplitude detector of the receiver as part of the matrixing network results in a circuit configuration which provides proper matrixing of the detected $(L-R)$ and $(L+R)$ signals to produce the required L and R signals without attenuation in a matrixing network. Additionally, the use of only a single diode in the AM detector reduces cross modulation between the AM and angle modulation channels. Specifically, any detected angle modulation signal appears with equal amplitude on both the anode and cathode of the AM detector diode 24 and thus can not produce deleterious effect in the AM channel; and, since only one AM detector diode is used, there is an inherent balanced voltage at the junction of the AM detector load circuits 34 and 36 and no signal can be fed from this point into the angle modulation channel to cause cross-modulation effects.

Thus, in accordance with the invention, a single envelope detector element is connected in circuit to provide a pair of output signals, respectively 180° out of phase. Each of these output signals is connected in series with the output signal from an angle modulation detector to provide the desired L and R information. The series connection is superior to the prior art parallel matrix arrangement since the entire magnitude of the detector outputs is effective in producing the L and R signals, and the novel series circuit disclosed requires less complicated circuitry and fewer circuit elements than the prior art matrix arrangements.

What is claimed is:

1. In a receiver for the reception of a wave amplitude modulated by a first signal and concurrently angle modulated by a second signal, a detector circuit for providing a pair of output signals representative respectively of the sum and difference between the said first and second signals including, in combination: an angle modulation detector having a pair of output terminals across which the second signal is developed, an amplitude detector including an electron discharge device having an anode and a cathode serially connected in circuit with a load impedance, said load impedance having an intermediate tap, a source of said modulated waves, means coupling said angle modulation detector and said amplitude detector to said source whereby a unidirectional current is caused to flow thru the device and said load impedance, means connecting one of said output terminals to said intermediate tap whereby one of said output signals is developed between the anode and said other terminal and the other of said output signals is developed between the cathode and said other terminal.

2. A detector circuit for a wave concurrently angle and amplitude modulated by related signals including in combination an impedance, means for developing said modulated wave across said impedance, an amplitude demodulator including a single rectifier device having an anode and a cathode, means coupling said demodulator to said impedance including a pair of resistor condenser networks serially connected in circuit between said anode and cathode, an angle modulation detector having an input circuit and having a two terminal output load circuit, means coupling said angle modulation detector input circuit to said impedance, means for mantaining the junction of the networks substantially at the potential of one terminal of the load circuit whereby the signal potentials developed between the anode and cathode, respectively, and the other terminal of the load circuit are representative of the sum of and difference between the angle modulation and amplitude modulation signals.

3. In a stereophonic receiver for the reception of an amplitude modulated wave, an amplitude modulation detector including in combination a source of amplitude modulated waves, a network comprised of resistor and capacitor elements, said network having end terminals and a third terminal intermediate the end terminals, a rectifier device having an anode and a cathode, means connecting said device and said network in series across said source to provide a single path of unidirectional current flow thru the device and network and develop substantially equal amplitude and oppositely phased voltages between the third terminal and end terminals respectively, a pair of spaced sound reproducers, and means for coupling one of the reproducers to one end terminal and the other reproducer to the other end terminal of said network.

4. A detector circuit for a wave amplitude and angle modulated by signals including: a source of modulated waves; a diode rectifier having an anode and a cathode electrode; a first and a second two terminal resistor-capacitor network; means connecting the two networks and the rectifier in series with the source to provide a closed path of unidirectional current flow through the rectifier, the networks, and the source; an angle modulation detector having input and output circuits; means coupling said input circuit to said source; means coupling said output circuit to the junction of the two networks; a first utilization circuit coupled to said output circuit and the first network; and a second utilization circuit coupled to said output circuit and the second network.

5. A detector circuit for a wave amplitude and angle modulated by signals including: a source of modulated waves; a diode rectifier having an anode and a cathode electrode; a first and a second two terminal resistor-capacitor network; means connecting the two networks and the rectifier in series with the source to provide a closed path of unidirectional current flow through the rectifier, the networks, and the source; an angle modulation detector having input and output circuits; means for applying the modulated waves from said source to said input circuit; means coupling said output circuit to the junction of the two networks; a first utilization circuit coupled to said output circuit and the first network; and a second utilization circuit coupled to said output circuit and the second network.

6. A detector circuit for a wave amplitude and angle modulated by signals including: a source of modulated waves; a diode rectifier having an anode and a cathode electrode; a first and a second two terminal resistor-capacitor network; means connecting the two networks and the rectifier in series with the source to provide a closed path of unidirectional current flow through the rectifier, the networks, and the source; an angle modulation detector having an output circuit and an input circuit coupled to receive modulated waves from said source; means including a de-emphasis network for coupling said output circuit to the junction of the two networks; a first utilization circuit coupled to said output circuit and the first network; and a second utilization circuit coupled to said output circuit and the second network.

References Cited in the file of this patent

UNITED STATES PATENTS

| | | |
|---|---|---|
| 2,472,301 | Koch | June 7, 1949 |
| 2,653,227 | Onder | Sept. 22, 1953 |

FOREIGN PATENTS

| | | |
|---|---|---|
| 638,423 | Great Britain | June 7, 1950 |

OTHER REFERENCES

Carroll: Recent Developments in Stereo Broadcasting, Electronics, April 3, 1959, pages 41 to 46.